(12) United States Patent
Li

(10) Patent No.: US 8,833,712 B2
(45) Date of Patent: Sep. 16, 2014

(54) POLE ASSEMBLY

(71) Applicants: Hong Fu Jin Precision Industry (ShenZhen) Co., Ltd., Shenzhen (CN); Hon Hai Precision Industry Co., Ltd., New Taipei (TW)

(72) Inventor: Feng Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 49 days.

(21) Appl. No.: 13/707,608

(22) Filed: Dec. 7, 2012

(65) Prior Publication Data

US 2014/0138501 A1  May 22, 2014

(30) Foreign Application Priority Data

Nov. 19, 2012 (CN) .......................... 2012 1 4676936

(51) Int. Cl.
*A47B 96/06* (2006.01)
*F16M 13/02* (2006.01)

(52) U.S. Cl.
CPC .................................... *F16M 13/02* (2013.01)
USPC ..................... 248/205.1; 248/219.4; 248/242; 16/229

(58) Field of Classification Search
USPC ............ 248/205.1, 219.4, 242; 182/187, 134; 212/179; 16/229
See application file for complete search history.

(56) References Cited

U.S. PATENT DOCUMENTS

| | | | | |
|---|---|---|---|---|
| 485,589 | A | * | 11/1892 | Ravenel et al. ................ 248/242 |
| 1,236,960 | A | * | 8/1917 | McMillan .................. 248/219.1 |
| 2,483,758 | A | * | 10/1949 | Douglas ........................ 248/242 |
| 2,552,205 | A | * | 5/1951 | Moss ............................. 224/259 |
| 3,485,382 | A | * | 12/1969 | Larson ......................... 211/150 |
| 3,922,870 | A | * | 12/1975 | Recalde ........................ 405/166 |
| 4,278,228 | A | * | 7/1981 | Rebentisch et al. .......... 248/548 |
| 4,394,948 | A | * | 7/1983 | Graber .......................... 224/314 |
| 4,428,459 | A | * | 1/1984 | Peck ............................. 182/187 |
| 4,644,713 | A | * | 2/1987 | Lehman .......................... 52/165 |
| 4,696,470 | A | * | 9/1987 | Fenner ......................... 482/142 |
| 4,722,421 | A | * | 2/1988 | Hilbert .......................... 182/187 |
| 4,909,353 | A | * | 3/1990 | Govin et al. .................. 182/187 |
| 4,989,766 | A | * | 2/1991 | Lewallyn et al. ............. 224/155 |
| 5,263,675 | A | * | 11/1993 | Roberts et al. ............. 248/219.4 |
| 5,281,078 | A | * | 1/1994 | Mills, Jr. ...................... 414/680 |
| 5,297,656 | A | * | 3/1994 | Amacker ...................... 182/187 |
| 5,601,274 | A | * | 2/1997 | Minor et al. .................. 248/594 |
| 5,622,237 | A | * | 4/1997 | Moldow .......................... 182/37 |
| 5,662,254 | A | * | 9/1997 | Lemajeur et al. ............. 224/405 |
| 5,775,655 | A | * | 7/1998 | Schmeets ...................... 248/240 |
| 5,897,100 | A | * | 4/1999 | Napier et al. ................. 254/8 B |

(Continued)

*Primary Examiner* — Terrell McKinnon
*Assistant Examiner* — Daniel Breslin
(74) *Attorney, Agent, or Firm* — Novak Druce Connolly Bove + Quigg LLP

(57) ABSTRACT

A pole assembly to be mounted on a supporting platform to support photovoltaic modules includes a supporting pole, a fixing pole pivotably attached to the supporting pole, a first mounting member fixed on the supporting platform, and a second mounting member fixed on the supporting platform. The first mounting member defines a locking slot. A pin is attached to one end of the supporting pole opposite to the fixing pole. The pin is locked into the locking slot of the first mounting member. One end of the fixing pole opposite to the supporting pole is fixed to the second mounting member.

8 Claims, 3 Drawing Sheets

(56) References Cited

U.S. PATENT DOCUMENTS

| | | | |
|---|---|---|---|
| 6,202,964 B1 * | 3/2001 | Thornhill | 248/219.4 |
| 6,457,728 B1 * | 10/2002 | Klais | 280/86.75 |
| 6,612,549 B1 * | 9/2003 | Woods, Jr. | 254/323 |
| 6,793,204 B2 * | 9/2004 | Albritton | 256/13.1 |
| 7,341,507 B1 * | 3/2008 | Julian, Sr. | 452/192 |
| 7,546,990 B1 * | 6/2009 | McGuire | 248/111 |
| 7,575,120 B2 * | 8/2009 | Beatty | 212/180 |
| 7,703,469 B2 * | 4/2010 | Danziger | 135/147 |
| D624,199 S * | 9/2010 | VanElverdinghe | D25/61 |
| D679,454 S * | 4/2013 | Moore, Jr. | D30/133 |

* cited by examiner

POLE ASSEMBLY

BACKGROUND

1. Technical Field

The present disclosure relates to poles, and particularly, to a pole assembly for supporting photovoltaic modules.

2. Description of Related Art

A pole assembly for photovoltaic modules may be made by welding a plurality of metal poles together with a non-flexible structure, which results in inconvenience in transportation of the pole assembly.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings in which like references indicate similar elements, is illustrated by way of examples and not by way of limitation. It should be noted that references to "an" or "one" embodiment in this disclosure are not necessarily to the same embodiment, and such references mean "at least one."

Figure 1:
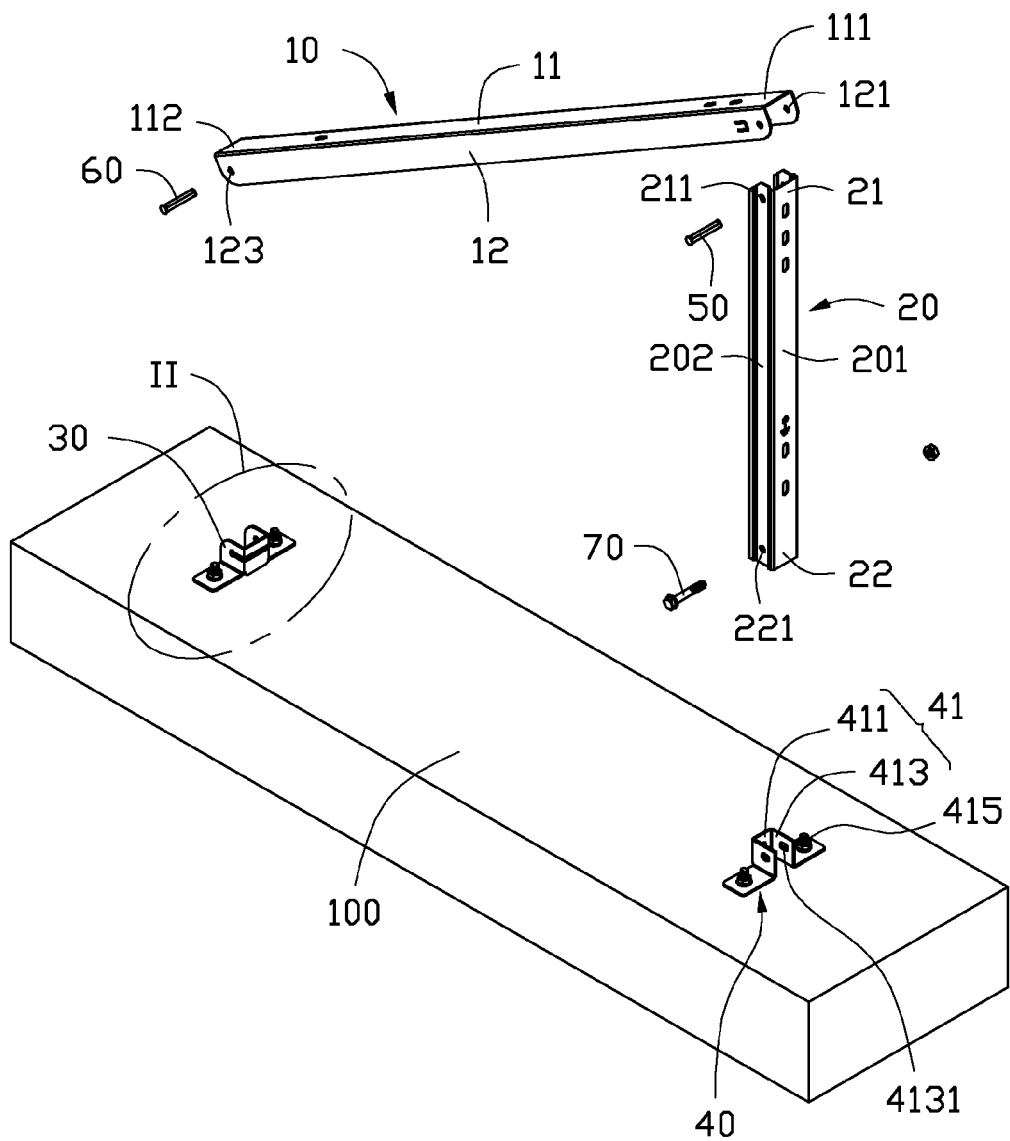
FIG. 1 is an exploded, isometric view of an embodiment of a pole assembly.

FIG. 1 is an embodiment of a pole assembly of the disclosure. The pole assembly includes a supporting pole 10, a fixing pole 20, a first mounting member 30, and a second mounting member 40.

The supporting pole 10 includes a middle plate 11 and two side plates 12 extending from opposite sides of the middle plate 11. Two pairs of opposite pivot holes 121 and 123 are defined in the side plates 12, at a first end 111 and a second end 112 of the supporting pole 10, respectively.

The fixing pole 20 includes a base wall 201 and two sidewalls 202 extending from opposite sides of the base wall. A pair of first through holes 211 and a pair of second through holes 221 are defined in the sidewalls, at a first end 21 and a second end 22 of the fixing pole 20, respectively.

Figure 2:
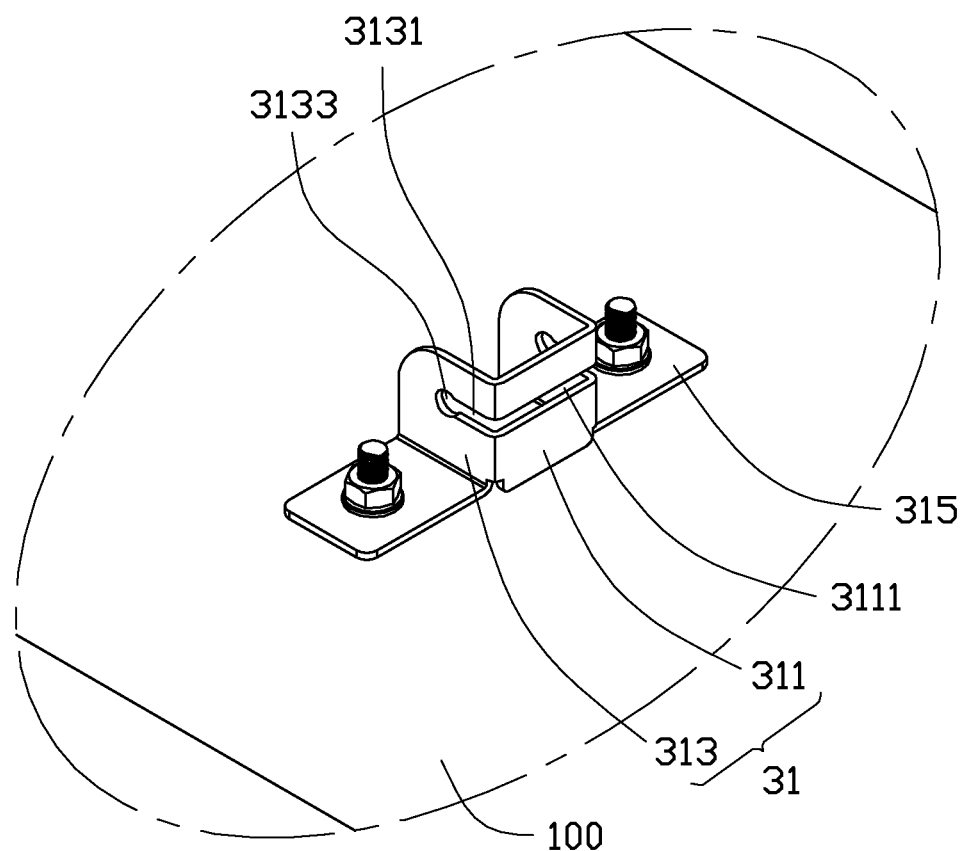
FIG. 2 is an enlarged view of a circled portion II of FIG. 1.

FIG. 2 shows that the first mounting member 30 is fixed to a first end of a supporting platform 100, such as the ground. The first mounting member 30 includes a U-shaped main body 31. The main body 31 includes a first sidewall 311 perpendicular to the supporting platform 100, and two second sidewalls 313 perpendicularly extending from opposite sides of the first sidewall 311 and perpendicular to the supporting platform 100. The first sidewall 311 defines a horizontal channel 3111. Each second sidewall 313 defines a locking slot 3131 communicating with the channel 3111. Each locking slot 3131 includes a substantially round receiving portion 3133 away from the channel 3111. A horizontal fixing piece 315 extends outward from a bottom of each second sidewall 313. The fixing pieces 315 are fixed to the supporting platform 100 through screws.

The second mounting member 40 is fixed to a second end of the supporting platform 100. The second mounting member 40 includes a substantially U-shaped connecting portion 41. The connecting portion 41 includes a first side plate 411 perpendicular to the supporting platform 100, and two second side plates 413 perpendicularly extending from opposite sides of the first side plate 411 and perpendicular to the supporting platform 100. Each second side plate 413 defines a mounting hole 4131. A horizontal fixing piece 415 extends outward from a bottom of each second side plate 413. The fixing pieces 415 are fixed to the supporting platform 100 through screws.

Figure 3:
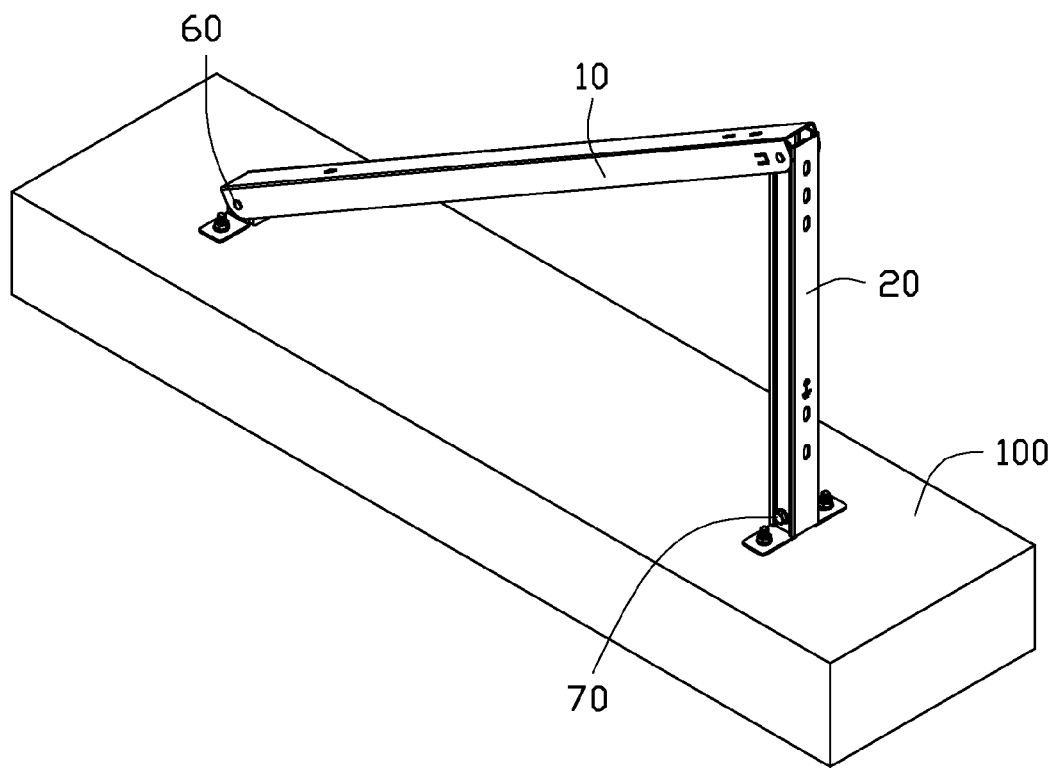
FIG. 3 is an assembled, isometric view of the pole assembly of FIG. 1.

FIG. 3 shows that in assembly, the first end 21 is pivotably attached to the first end 111 through a shaft 50 extending through the first through holes 211 and the pivot holes 121. A pin 60 extends through the pivot holes 123 of the second end 112.

When the pole assembly is needed to support photovoltaic modules, the pin 60 is inserted in the locking slots 3131 through the channel 3111, until the pin 60 is received in the receiving portions 3133. A screw 70 extends through the mounting holes 4131 and the second through holes 221 to fix the second end 22 to the second mounting member 40. Thus, the pole assembly is mounted on the supporting platform 100.

When it is needed to transport or store the pole assembly, the fixing pole 20 can be rotated about the shaft 50 to be received in the supporting pole 10 between the side plates 22.

In the embodiment, the pole assembly can be folded to save space, which is convenient for transportation. To use, the pin 60 is locked to the locking slot 3131, and the second end 22 is fixed to the second mounting member 40, thus the pole assembly can be conveniently assembled.

It is to be understood, however, that even though numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A pole assembly mounted on a supporting platform to support photovoltaic modules, the pole assembly comprising:

a supporting pole comprising a first end and a second end opposite to the first end;

a fixing pole comprising a first end pivotably attached to the first end of the supporting pole, and a second end opposite to the supporting pole;

a first mounting member fixed on the supporting platform, wherein the first mounting member comprises a first sidewall, and two second sidewalls extending from opposite sides of the first sidewall, the first sidewall defines a horizontal channel, each second sidewall defines a locking slot communicating with the channel; and a second mounting member fixed on the supporting platform;

wherein a pin is attached to the second end of the supporting pole, when connecting the supporting pole to the supporting platform, or assembling the pole assembly, the pin passes through the channel to be locked in the locking slots of the first mounting member, the second end of the fixing pole is fixed to the second mounting member, and wherein the supporting pole comprises a middle plate and two side plates extending from opposite sides of the middle plate, two pairs of opposite pivot holes are defined in the side plates, at the first end and the second end of the supporting pole, respectively, and the first end of the supporting pole is pivotably attached to the fixing pole through a shaft extending through the pivot holes of the first end of the supporting pole and the fixing pole.

2. The pole assembly of claim 1, wherein the first sidewall and two second sidewalls are perpendicular to the supporting platform.

3. The pole assembly of claim 2, wherein each locking slot comprises a substantially round receiving portion opposite to the channel, for receiving the pin.

4. The pole assembly of claim 2, wherein a horizontal fixing piece extends outward from a bottom of each second sidewall, for being mounted to the supporting platform through screws.

5. The pole assembly of claim 1, wherein the pin extends through the pivot holes of the second end of the supporting pole.

6. The pole assembly of claim 1, wherein the second mounting member comprises a substantially U-shaped connecting portion, the connecting portion comprises a first side plate perpendicular to the supporting platform, and two second side plates extending from opposite sides of the first side plate and perpendicular to the supporting platform, each second side plate defines a mounting hole, a screw extends through the mounting holes of the second side plates and the second end of the fixing pole to fix the second end of the fixing pole to the second mounting member.

7. The pole assembly of claim 6, wherein a horizontal fixing piece extends outward from a bottom of each second side plate, the fixing pieces are fixed to the supporting platform through screws.

8. A pole assembly mounted on a supporting platform to support photovoltaic modules, the pole assembly comprising:

a supporting pole comprising a first end and a second end opposite to the first end;

a fixing pole comprising a first end pivotably attached to the first end of the supporting pole, and a second end opposite to the supporting pole;

a first mounting member fixed on the supporting platform, wherein the first mounting member comprises a first sidewall, and two second sidewalls extending from opposite sides of the first sidewall, the first sidewall defines a horizontal channel, each second sidewall defines a locking slot communicating with the channel; and a second mounting member fixed on the supporting platform;

wherein a pin is attached to the second end of the supporting pole, when connecting the supporting pole to the supporting platform, or assembling the pole assembly, the pin passes through the channel to be locked in the locking slots of the first mounting member, the second end of the fixing pole is fixed to the second mounting member, wherein the supporting pole comprises a middle plate and two side plates extending from opposite sides of the middle plate, two pairs of opposite pivot holes are defined in the side plates, at the first end and the second end of the supporting pole, respectively, and the first end of the supporting pole is pivotably attached to the fixing pole through a shaft extending through the pivot holes of the first end of the supporting pole and the fixing pole, wherein the first sidewall and two second sidewalls are perpendicular to the supporting platform, and wherein each locking slot comprises a substantially round receiving portion opposite to the channel, for receiving the pin.

\* \* \* \* \*